(12) United States Patent
Xing et al.

(10) Patent No.: US 11,909,744 B2
(45) Date of Patent: Feb. 20, 2024

(54) NETWORK VERIFICATION METHOD AND APPARATUS

(71) Applicant: HUAWEI TECHNOLOGIES CO., LTD., Shenzhen (CN)

(72) Inventors: Chao Xing, Nanjing (CN); Keke Xu, Nanjing (CN); Ying Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 365 days.

(21) Appl. No.: 17/360,028

(22) Filed: Jun. 28, 2021

(65) Prior Publication Data
US 2021/0329004 A1 Oct. 21, 2021

Related U.S. Application Data

(63) Continuation of application No. PCT/CN2019/127244, filed on Dec. 21, 2019.

(30) Foreign Application Priority Data

Apr. 11, 2019 (CN) .......................... 201910290613.6

(51) Int. Cl.
G06F 7/04 (2006.01)
G06F 15/16 (2006.01)
(Continued)

(52) U.S. Cl.
CPC .......... *H04L 63/12* (2013.01); *H04L 41/0813* (2013.01); *H04L 41/0883* (2013.01);
(Continued)

(58) Field of Classification Search
CPC ...... H04L 63/12; H04L 63/0876; H04L 63/20
(Continued)

(56) References Cited

U.S. PATENT DOCUMENTS

2004/0168138 A1 8/2004 Neal et al.
2009/0161679 A1 6/2009 Yang et al.
(Continued)

FOREIGN PATENT DOCUMENTS

CN 101894192 A 11/2010
CN 103782615 A 5/2014
(Continued)

OTHER PUBLICATIONS

Enns et al. "Network Configuration Protocol (NETCONF)." Internet Engineering Task Force (IETF), Request for Comments: 6241. Jun. 2011. 113 pages.
(Continued)

*Primary Examiner* — Jeffrey C Pwu
*Assistant Examiner* — Samuel Ambaye
(74) *Attorney, Agent, or Firm* — Maier & Maier, PLLC

(57) ABSTRACT

A network verification system obtains configuration data of a plurality of network devices, where a data model of the configuration data is described by using a general data modeling language independent of the network devices; and the network verification system verifies data links between the plurality of network devices based on the configuration data of the plurality of network devices and a topology structure between the plurality of network devices. The network verification system verifies the data links between the plurality of network devices based on the topology structure between the plurality of network devices and the configuration data described by using the general data modeling language independent of the network devices. This helps improve scalability of the network verification system and avoids relatively poor scalability of network simulation software that occurs when conventional network simulation software provides a template for configuration data of each type of network device.

15 Claims, 6 Drawing Sheets

(51) Int. Cl.
  *H04L 29/06* (2006.01)
  *H04L 9/40* (2022.01)
  *H04L 41/0813* (2022.01)
  *H04L 41/08* (2022.01)
  *H04L 45/42* (2022.01)

(52) U.S. Cl.
  CPC .......... *H04L 45/42* (2013.01); *H04L 63/0876* (2013.01); *H04L 63/20* (2013.01)

(58) Field of Classification Search
  USPC .......................................................... 726/3
  See application file for complete search history.

(56) References Cited

U.S. PATENT DOCUMENTS

| | | | |
|---|---|---|---|
| 2013/0219496 A1* | 8/2013 | Nie | H04L 63/1408 726/22 |
| 2015/0019193 A1 | 1/2015 | Boutillier et al. | |
| 2017/0187577 A1* | 6/2017 | Nevrekar | H04L 41/0226 |
| 2018/0041400 A1 | 2/2018 | Ngoo et al. | |
| 2018/0351791 A1* | 12/2018 | Nagarajan | H04L 41/0895 |

FOREIGN PATENT DOCUMENTS

| | | |
|---|---|---|
| CN | 104065514 A | 9/2014 |
| CN | 104065536 A | 9/2014 |
| CN | 104954166 A | 9/2015 |
| CN | 105634787 A | 6/2016 |
| CN | 106656792 A | 5/2017 |
| CN | 107749807 A | 3/2018 |
| CN | 108717362 A | 10/2018 |
| CN | 109361550 A | 2/2019 |
| WO | 2018/100437 A1 | 6/2018 |
| WO | 2018231901 A1 | 12/2018 |

OTHER PUBLICATIONS

Aurojit Panda et al., "Verifying Reachability in Networks with Mutable Datapaths", 14th USENIX Symposium on Networked Systems Design and Implementation, Mar. 27, 2017, total 20 pages.

Yahui Li et al., "A Survey on Network Verification and Testing With Formal Methods: Approaches and Challenges", IEEE Communications Surveys & Tutorials, vol. 21, No. 1, First Quarter 2019, total 30 pages.

* cited by examiner

NETWORK VERIFICATION METHOD AND APPARATUS

CROSS-REFERENCE TO RELATED APPLICATIONS

This application is a continuation of International Application No. PCT/CN2019/127244, filed on Dec. 21, 2019, which claims priority to Chinese Patent Application No. 201910290613.6, filed on Apr. 11, 2019, both of which are hereby incorporated by reference in their entireties.

TECHNICAL FIELD

The embodiments relate to the field of information technologies, and more specifically, to a network verification method and an apparatus.

BACKGROUND

A network simulation technology is a simulation technology in which network performance data required for network design or optimization is obtained by establishing a network model and simulating network traffic transmission. The technology is mainly applied to development and evaluation of new network protocols and network devices, and network planning and design. The network simulation technology can quickly establish a network model and facilitate model modification, and can be applied to network performance prediction, capacity planning, fault analysis, end-to-end performance analysis, and guiding new network construction.

Because data models of configuration data of network devices produced by different manufacturers are different, data models of configuration data of network devices of different models may also be different. Therefore, network simulation software usually provides data models of various configuration data, and operation and maintenance personnel can fill configuration data of a real network to be simulated in the data model of the configuration data, to establish a network model.

However, scalability of the foregoing network simulation software is relatively poor. Time for the network simulation software to update the data model of the configuration data is late, usually after a new network device is put into use for a relatively long time. Consequently, before the network simulation software adds a data model of configuration data of the new network device, the operation and maintenance personnel cannot use the network simulation software to simulate a real network that includes the new network device.

SUMMARY

The embodiments provide a network verification method and an apparatus, to improve scalability of a network verification system.

According to a first aspect, a network verification method is provided, including: A network verification system obtains configuration data of a plurality of network devices, where a data model of the configuration data is described by using a general data modeling language independent of the network devices; and the network verification system verifies data links between the plurality of network devices based on the configuration data of the plurality of network devices and a topology structure between the plurality of network devices.

In the foregoing method, the network verification system may verify the data links between the plurality of network devices based on the topology structure between the plurality of network devices and the configuration data described by using the general data modeling language independent of the network devices. This helps improve scalability of the network verification system, and avoids relatively poor scalability of network simulation software that occurs when conventional network simulation software provides a template for configuration data of each type of network device.

In a possible implementation, that the network verification system verifies data links between the plurality of network devices based on the configuration data of the plurality of network devices and a topology structure between the plurality of network devices includes: The network verification system calculates, based on the configuration data of the plurality of network devices and the topology structure between the plurality of network devices, a route to obtain routing forwarding entries of the plurality of network devices. The network verification system verifies the data links between the plurality of network devices based on the routing forwarding entries of the plurality of network devices.

In the embodiments, the routing forwarding entries are directly generated based on the configuration data of the plurality of network devices, and the data link of a network is verified based on the routing forwarding entries. This helps simplify a process of obtaining the routing forwarding entries, and avoids a case in which the network device needs to perform route learning based on the configuration data (for example, an IP address) to obtain the routing forwarding entries in a data link transmission process.

In a possible implementation, the data model includes a common data attribute of the configuration data and an extensible data attribute of the configuration data. The extensible data attribute may be associated with a data attribute that is not added to the data model, for example, a vendor private attribute. The common data attribute includes a frequently used data attribute. For example, the common data attribute may include one or more of the following data attributes: a configuration name, a device type, a device interface, a device Internet Protocol IP address, or a virtual private network routing and forwarding table VRF.

In the foregoing method, the extensible data attribute is added to the data model, and scalability of the data model is improved. In addition, a data model includes a plurality of frequently used data attributes of the configuration data. This avoids a case in which different data attributes of the configuration data are carried in different YANG models when the configuration data is described based on a conventional YANG model. This improves a description capability of the data model.

The configuration data of the plurality of network devices may include configuration data of a first network device. The method further may include: The network verification system performs configuration verification on the first network device based on the configuration data of the first network device, where the configuration verification is to verify one or more data attributes of a data model of the configuration data of the first network device.

The first network device may be any one of the plurality of network devices.

In the foregoing method, the network verification system may perform the configuration verification based on the data model of the configuration data of the first network device, to simplify a configuration verification process. This avoids that in a conventional configuration verification process, because different data attributes in the configuration data are carried in different YANG models, when a plurality of data attributes of the configuration data need to be verified, verification needs to be separately performed on the YANG models of the plurality of data attributes.

The data model of the configuration data may be configuration data required for performing verification on configuration of the network. In this way, a data model of the configuration data may verify configuration data required for performing the configuration verification. This helps simplify a process of obtaining the configuration data, and avoids a case in which different types of configuration data are carried in different YANG models when the conventional YANG model is used.

The foregoing common data attribute includes a frequently used data attribute required for performing data link verification on the network, or the common data attribute includes a frequently used data attribute required for performing configuration verification on the network.

In the foregoing method, a data attribute required for performing the data link verification, or a data attribute required for the configuration verification is integrated in a data template, to simplify a network verification process. This avoids that in a conventional verification process, because different data attributes in the configuration data are carried in different YANG models, verification usually needs to be performed on a plurality of YANG models during network verification.

In a possible implementation, the data model of the configuration data may be in a tree structure.

In the embodiments, the tree structure may be used to represent the data model of the configuration data, that is, a data model having a structure similar to that of the YANG model may be used, so that a matching degree between the data model of the configuration data and a NETCONF protocol is similar to a matching degree between the YANG model and the NETCONF protocol. This helps promote the foregoing data model of the configuration data according to the NETCONF protocol.

In addition, because a structure of the data model of the configuration data in the embodiments is similar to a YANG model, performance that the YANG model may be used to convert a NETCONF packet may be used, so that the data model of the configuration data and the NETCONF packet are combined and applied to the current network. The foregoing process of converting the data model of the configuration data into the NETCONF packet may be referred to as "YANG transformation of a data model of configuration data".

In a possible implementation, the configuration data may include any one of the following: to-be-configured configuration data; configured configuration data, and to-be-updated configuration data.

In the embodiments, based on different types of configuration data, a corresponding verification process may be classified as a "pre-event verification process" or a "post-event verification process", so that the method in the embodiments may be compatible with verification processes in a plurality of scenarios.

In a possible implementation, the plurality of network devices may include a second network device, the general data modeling language is the YANG model. That the network verification system obtains configuration data of a plurality of network devices on the network includes: The network verification system receives a Network Configuration Protocol NETCONF packet, where the NETCONF packet includes configuration data of the second network device, and the configuration data of the second network device is used to configure the second network device, or update configuration of the second network device.

The configuration data used to configure the second network device may be understood as the foregoing to-be-configured configuration data, and the configuration data used to update the configuration of the second network device may be understood as the foregoing to-be-updated configuration data.

The NETCONF packet may be combined with the data model of the configuration data. This helps promote the data model of the configuration data by using a promotion degree of the NETCONF protocol.

According to a second aspect, a network verification apparatus is provided. The network verification apparatus may include modules configured to perform the implementations of the foregoing method.

According to a third aspect, a network verification system is provided, including an input/output interface, a processor, and a memory. The processor may be configured to control the input/output interface to receive or send information. The memory may be configured to store a computer program. The processor may be configured to invoke the computer program in the memory and run the computer program, so that the network verification system is enabled to perform the methods in the first aspect.

According to a fourth aspect, a computer program product is provided. The computer program product may include computer program code, and when the computer program code is run on a computer, the computer may be enabled to perform the methods in the first aspect.

It may be understood that some or all of the computer program code may be stored in a first storage medium. The first storage medium may be encapsulated with a processor or may be encapsulated separately from a processor, but is non-limiting.

According to a fifth aspect, a computer-readable medium is provided. The computer-readable medium may store program code, and when the computer program code is run on a computer, the computer may be enabled to perform the methods in the foregoing aspects.

DETAILED DESCRIPTION OF THE EMBODIMENTS

The following describes solutions of the embodiments with reference to accompanying drawings.

A conventional network verification process may be implemented based on network simulation software. In the network simulation software, a plurality of data models of configuration data may be configured to correspond to network devices that use different data models of the configuration data. In a solution in which network devices of different vendors are described based on the plurality of data models of the configuration data to implement a solution of simulating a real network, scalability may be relatively poor. When a data model of configuration data corresponding to a network device is not added to the network simulation software, operation and maintenance personnel cannot use the network simulation software to simulate a network that includes the foregoing network device.

To avoid the foregoing problem, the embodiments provide a network verification method. In the method, a network verification system describes configuration data of different network devices based on a common model, decoupling a binding relationship between a data model of configuration data and a network device, to improve scalability of the network verification system.

Figure 1:
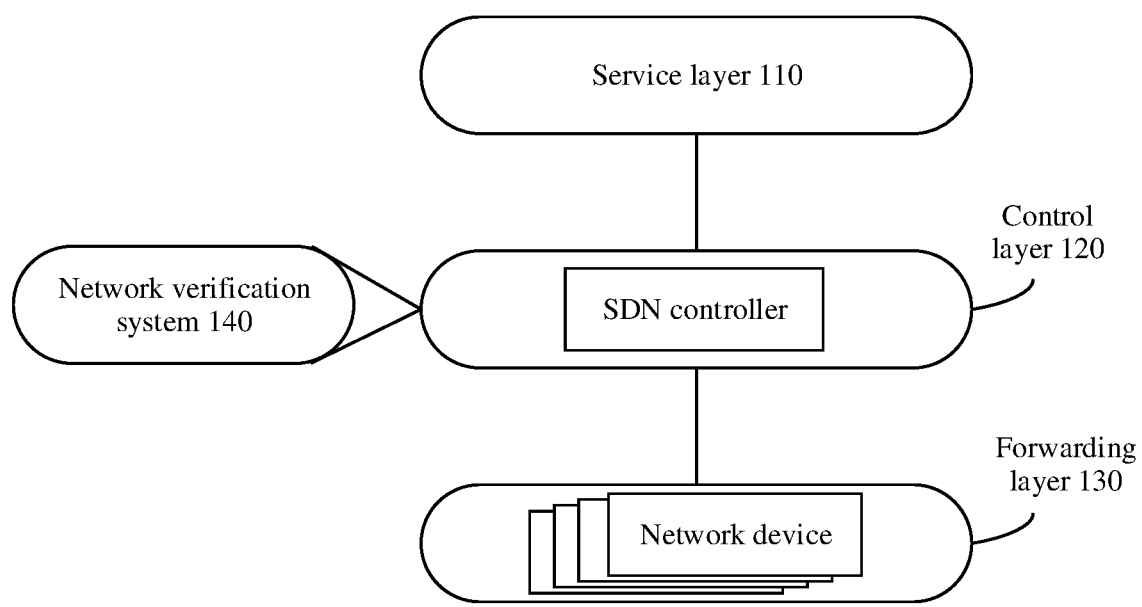
FIG. 1 is a schematic diagram of an SDN network architecture to which an embodiment is applicable.

For ease of understanding, with reference to FIG. 1, a network architecture is first described by using an example in which is the embodiments are applicable to a software-defined networking (SDN) architecture. It may be understood that the method in the embodiments may be further applied to another network architecture.

FIG. 1 is a schematic diagram of an SDN network architecture to which an embodiment is applicable. The network architecture shown in FIG. 1 includes an application layer 110, a control layer 120, a forwarding layer 130, and a network verification system 140.

The application layer 110 may be configured to implement presentation of a network service.

The forwarding layer 130, also referred to as an infrastructure layer, may be configured to implement routing or switching functions. The forwarding layer 130 may include a plurality of network devices, and the network devices may be a switch, a router, and the like.

The control layer 120 may be configured to centrally manage the network devices at the forwarding layer 130. The control layer may include an SDN controller, and the SDN controller may centrally manage the network devices at the forwarding layer. For example, the SDN controller may configure corresponding configuration data for each network device.

The foregoing control layer may configure, modify, and delete configuration data for the network device at the forwarding layer according to a Network Configuration Protocol (NETCONF). For example, a NETCONF-client may be disposed on the SDN controller, and a NETCONF-server may be disposed on the network device. In this way, the SDN controller communicates with the NETCONF-server in the network device by using the NETCONF-client, to configure, modify, and delete the configuration data of the network device according to the NETCONF.

The network verification system 140 may be used to verify configuration or a data link of the network device at the forwarding layer.

Figure 2:
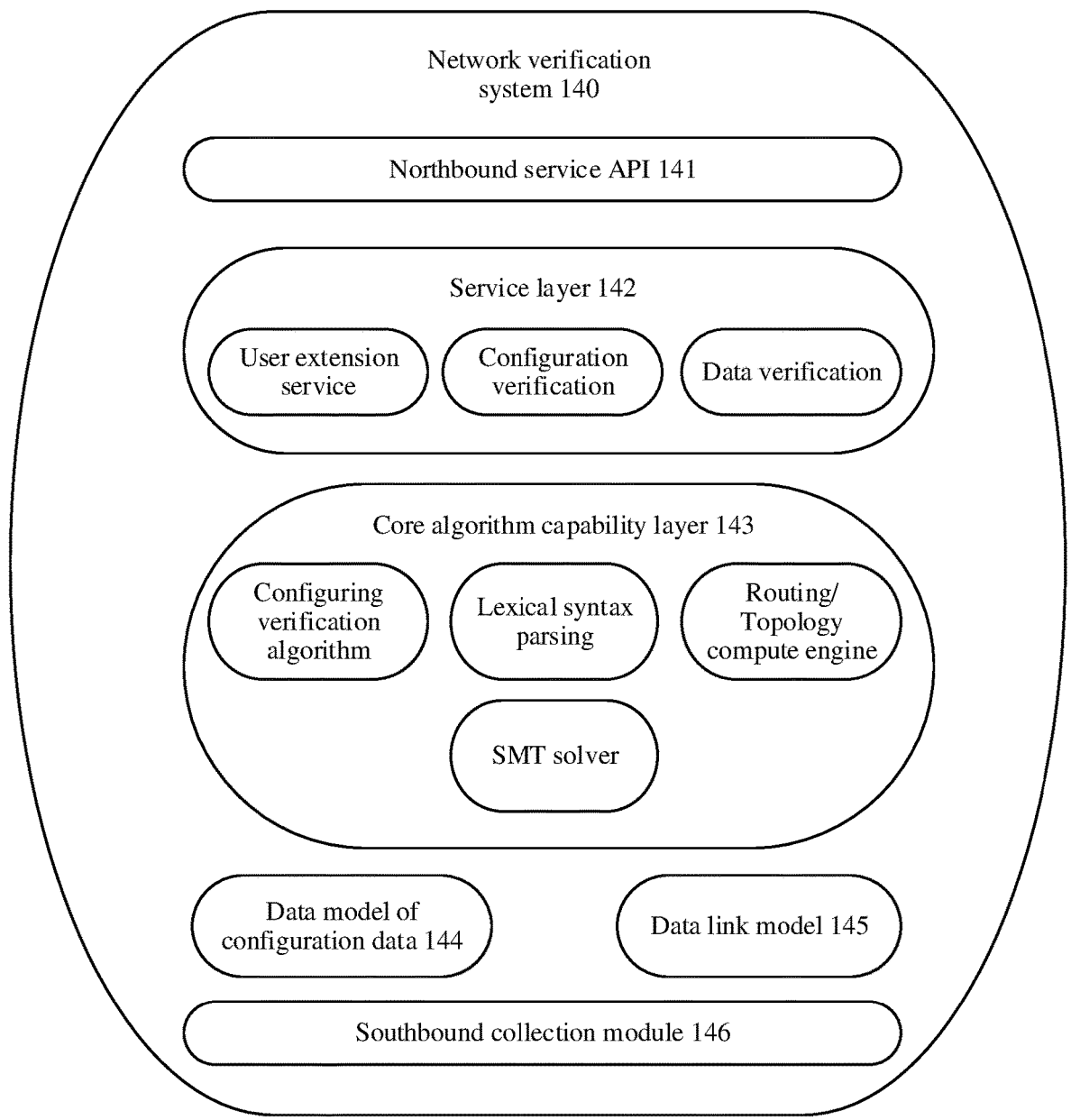
FIG. 2 is a schematic block diagram of a network verification system 140 according to an embodiment.

With reference to FIG. 2, the following describes an architecture of a network verification system according to an embodiment. It may be understood that the network verification system shown in FIG. 2 is merely intended to facilitate understanding of the solutions, and is non-limiting. The network verification system may alternatively be in another form. For example, based on an actual application, some functions in the network verification system may be deleted or some functions in the network verification system may be combined.

FIG. 2 is a schematic block diagram of a network verification system 140 according to an embodiment. The network verification system 140 shown in FIG. 2 may include a northbound service application programming interface (API) layer 141, a service layer 142, a core algorithm capability layer 143, a data model of configuration data 144, a data link model 145, and a southbound collection module 146.

The northbound service API layer 141 is configured to provide a service-oriented representational state transfer (RESTful) interface for invocation of a northbound user interface (UI) or a third-party application.

The service layer 142 may be configured to provide functions such as configuration verification, data link verification, and a user extension service.

The configuration verification may be used to verify configuration data of a network device, and may include configuration content verification, multi-configuration consistency verification, security policy redundancy or conflict verification, IP conflict detection, planning configuration consistency detection, and the like.

The configuration content verification may be used to verify whether configuration data of the network device meets device specification/standard requirement.

The multi-configuration consistency verification may be used to verify whether a plurality of pieces of configuration data configured for a network device on a network is consistent.

The security policy redundancy or conflict verification may be used to verify whether security policies related to network devices on the network conflict or are redundant.

The IP conflict detection may be used to obtain configuration data from different network devices to detect whether the configuration data of different network devices has a same IP address. If the configuration data has the same IP address, an IP address conflict occurs on the network.

The planning configuration consistency detection: In a data communication network (DCN) scenario, when zero touch provisioning (ZTP) is deployed, a planning configuration is generated based on a requirement of a user. After the planning configuration is delivered to a device, and after the configuration takes effect, whether the delivered configuration is the same as configuration that takes effect on the network device and whether the delivered configuration complies with a plan of the user need to be verified. Whether planned configuration data is the same as generated configuration data is compared, reachability verification on a data link on the entire network is performed based on the generated configuration data, and a connectivity status of the data link on the network is displayed to the user.

For verifying the planning configuration consistency detection, another scenario is to verify whether a network CDN node selection is optimal and whether a CDN node planned by the user is optimal on the entire network. After verification by a verification engine, a conclusion can be drawn or a more suitable and efficient node selection can be provided compared with the current planning of the user.

The foregoing data link verification is used to verify a data link on the network, and may include data link reachability verification, data link loop check, data link consistency detection, data link black hole check, and the like.

The data link reachability verification may be used to verify whether a source network device on a data link on the network is reachable to a target network device. The data link consistency detection is used to detect whether data in a data packet transmitted through a data link is consistent with data before transmission. The data link black hole check is used to check whether a black hole router exists on the network. The foregoing user extension function is used to support a user to expand a verification plugin based on a requirement. A requirement model and a result model may be included. The requirement model is used by a user to define a question to-be-verified, and the result model is used to return a verification result.

The core algorithm capability layer 143 may be configured to provide a basic algorithm capability. A configuration verification algorithm, lexical syntax parsing, a routing/topology compute engine, and a satisfiability modulo theories (SMT) solver may be included.

The configuration verification algorithm may be used to perform verification on the configuration data of the network device on the network. It may be understood that the configuration verification algorithm is a basic algorithm for configuration verification at the foregoing service layer. The lexical syntax parsing is used to perform lexical syntax parsing on a data model of obtained configuration data, to convert the data model into a common model. The routing/topology compute engine is configured to compute, based on the configuration information of the network device on the network and a topology structure in the network, a routing forwarding entry used by a transmission packet on the network. When the foregoing routing forwarding entry is represented by using a group of first-order logical formulas, the SMT solver may verify the data link on the network.

The data model of the configuration data 144 may be configured to describe the configuration data of a network device on the network. A data model of configuration data collected from the network may be included, a model of configuration data that has been configured for the network device on the network, and a data model of configuration data that is to be configured for the network device on the network.

The data link model 145 may be used to describe a model of a data link on the network. For example, the data link model may be the foregoing group of first-order logic formulas.

The southbound collection module 146 may be configured to collect the configuration data of the network device on the network. Generally, the NETCONF-client is configured on the foregoing southbound collection module, so that the southbound collection module 146 may collect the configuration data of the network device on the network according to the NETCONF.

It may be understood that the network configuration verification system 140 may be deployed in the SDN controller, or may be independently deployed in a server, this is non-limiting.

Figure 3:
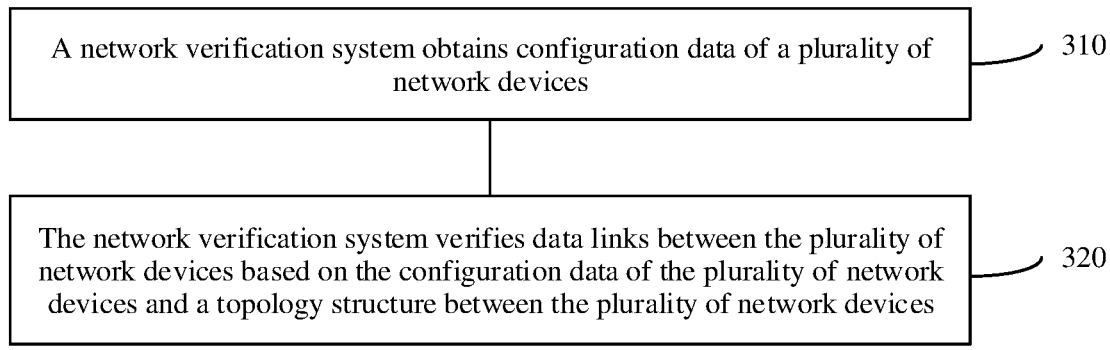
FIG. 3 is a schematic flowchart of a network verification method according to an embodiment.

The following describes a network verification method in an embodiment with reference to FIG. 3. It may be understood that the method may be performed by the network verification system 140 in FIG. 1, and the method shown in FIG. 3 relates to a data link verification solution, and may be jointly performed by modules used for data link verification in the network verification system, for example, modules such as a routing/topology compute engine, and a data link model 145 that are used for data link verification.

FIG. 3 is a schematic flowchart of a network verification method according to an embodiment. The method shown in FIG. 3 includes step 310 and step 320.

310. A network verification system obtains configuration data of a plurality of network devices, where a data model of the configuration data is described by using a general data modeling language independent of the network devices.

The foregoing configuration data of the network device may include an IP address, a subnet mask, a gateway, a port, a physical address, a firewall, and the like of the network device.

The foregoing configuration data of the plurality of network devices may include configuration data that has been configured for the network devices, and may alternatively be configuration data that is to be configured for the network devices and configuration data that is to be updated for the network devices. A manner of obtaining the configured configuration data and the to-be-configured configuration data by the network verification system is described in detail in the following.

It may be understood that, if a data model of configuration data used by a network device of each vendor is established based on the foregoing data model, the network verification system may directly collect the configuration data from the network device. If the data model of the configuration data used by the network device of each vendor is a data model related to the network device or a data model related to the vendor, the data model related to the network device or the data model related to the vendor needs to be converted into the foregoing data model independent of the network devices. A conversion process between the foregoing data models may be performed by operation and maintenance personnel, and then input into the foregoing network verification system.

The foregoing data model conversion process may include: If the network device depends on a Secure Shell (SSH) protocol, a vendor feature model of the network device may be first converted into a common model that is based on the SSH protocol, and then the common model that is based on the SSH protocol is converted into a data model in this embodiment. If the network device supports the NETCONF protocol, the configuration data in the network device is converted from a vendor attribute binding-aware (BA) model into a BI YANG model, and then the binding-independent (BI) YANG model is converted into the data model in this embodiment. The BA model refers to a plugin that uses Java bindings automatically generated based on a definition of the YANG model. The BI model refers to a plugin that uses an API in a Document Object Model (DOM) format and that does not depend on the Java bindings.

The data model of the configuration data may include a common data attribute of the configuration data and an extensible data attribute of the configuration data. The extensible data attribute may be associated with a data attribute that is not added to the data model or a network device private attribute, for example, a vendor private attribute. The common data attribute includes a frequently used data attribute.

The common data attribute may include a frequently used data attribute required for performing data link verification on the network, or the common data attribute includes a frequently used data attribute required for performing configuration verification on the network.

A principle of the data model of the configuration data used in this embodiment is similar to that of the YANG model. However, the data model of the configuration data includes the configuration data required for verifying the data link of the network, or includes the configuration data required for verifying configuration of the network. In this way, configuration data required for the data link verification or the configuration verification can be obtained by using one data model of configuration data. This helps simplify a process of obtaining the configuration data and avoids a case in which different types of configuration data are carried in different YANG models when a conventional YANG model is used. For example, in the conventional YANG model, configuration data such as an access control list and a device interface uses an independent YANG model.

Figure 4:
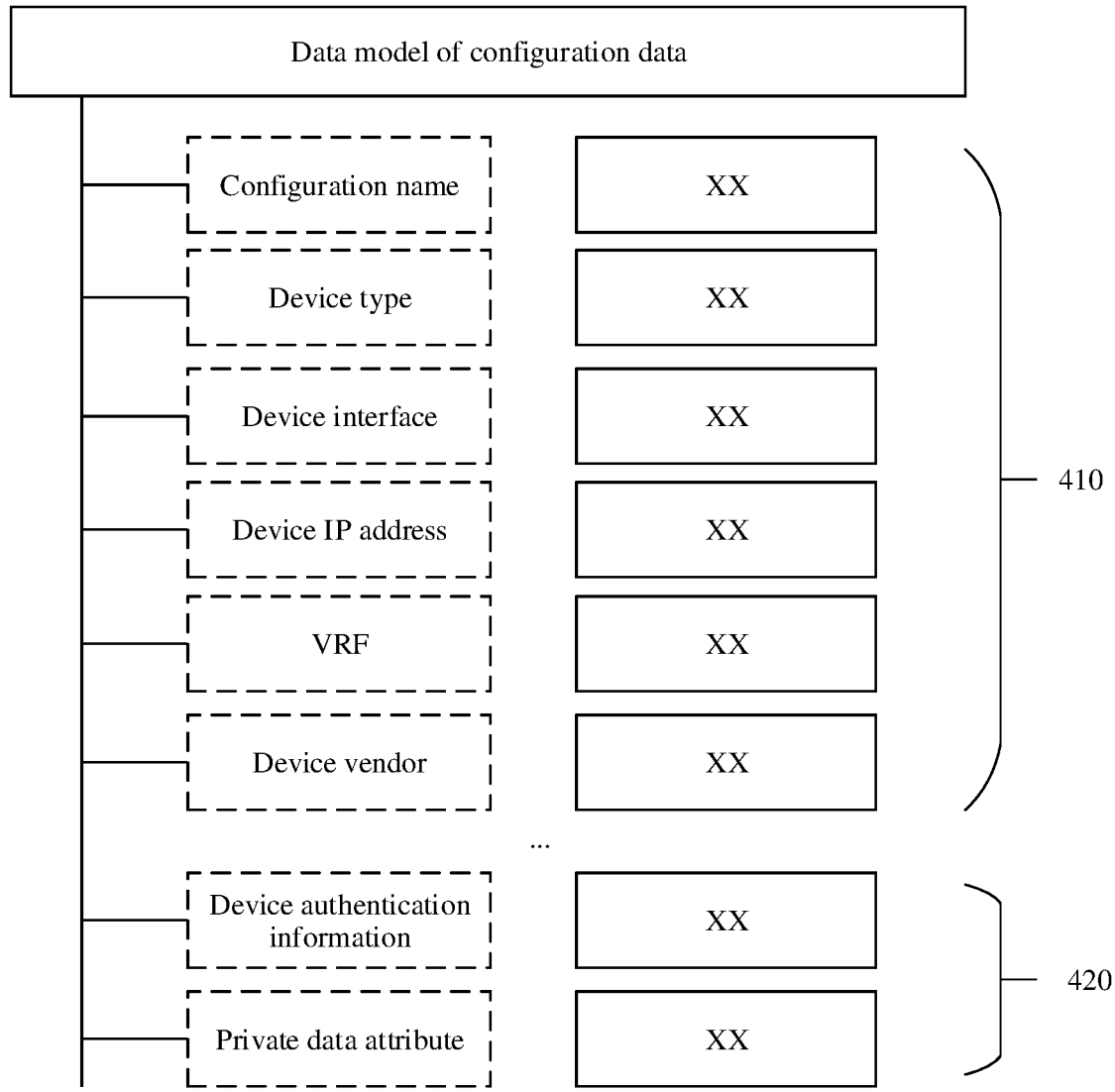
FIG. 4 is a schematic diagram of an organization form of a data model of configuration data according to an embodiment.

FIG. 4 is a schematic diagram of an organization form of a data model of configuration data according to an embodiment. FIG. 4 describes the data model in this embodiment only for ease of understanding. For a real logical structure of the data model, refer to FIG. 5. The data model shown in FIG. 4 includes a common data attribute 410, and an extensible data attribute 420.

The common data attribute 410 includes a configuration name, a device type, a device interface, a device IP address, a virtual private network routing and forwarding table (VRF), a security domain, a device vendor, and the like.

The extensible data attribute 420 may include an extended value attribute and an extended private attribute. The extended value attribute may be understood as a data attribute that has an extended value, that is, a data attribute that is not included in a current data model but that is subsequently considered to be added to the data model, for example, device authentication information. The extended private attribute may include a device-related private data attribute and a vendor private data attribute.

The data model of the configuration data may be in a tree structure. The configuration data in the foregoing data model may be stored in a node of the tree structure.

In the organization form of the data model shown in FIG. 4, the extensible data attribute may correspond to a path of configuration data of the extensible data attribute, and the path points to a node that stores the configuration data of the extensible data attribute and that is in the tree structure. For example, if the extensible data attribute is the device authentication information, in the organization form shown in FIG. 4, the extensible data attribute may correspond to a path of the device authentication information, and the path may point to a node that stores the device authentication information and that is in the tree structure.

Figure 5:
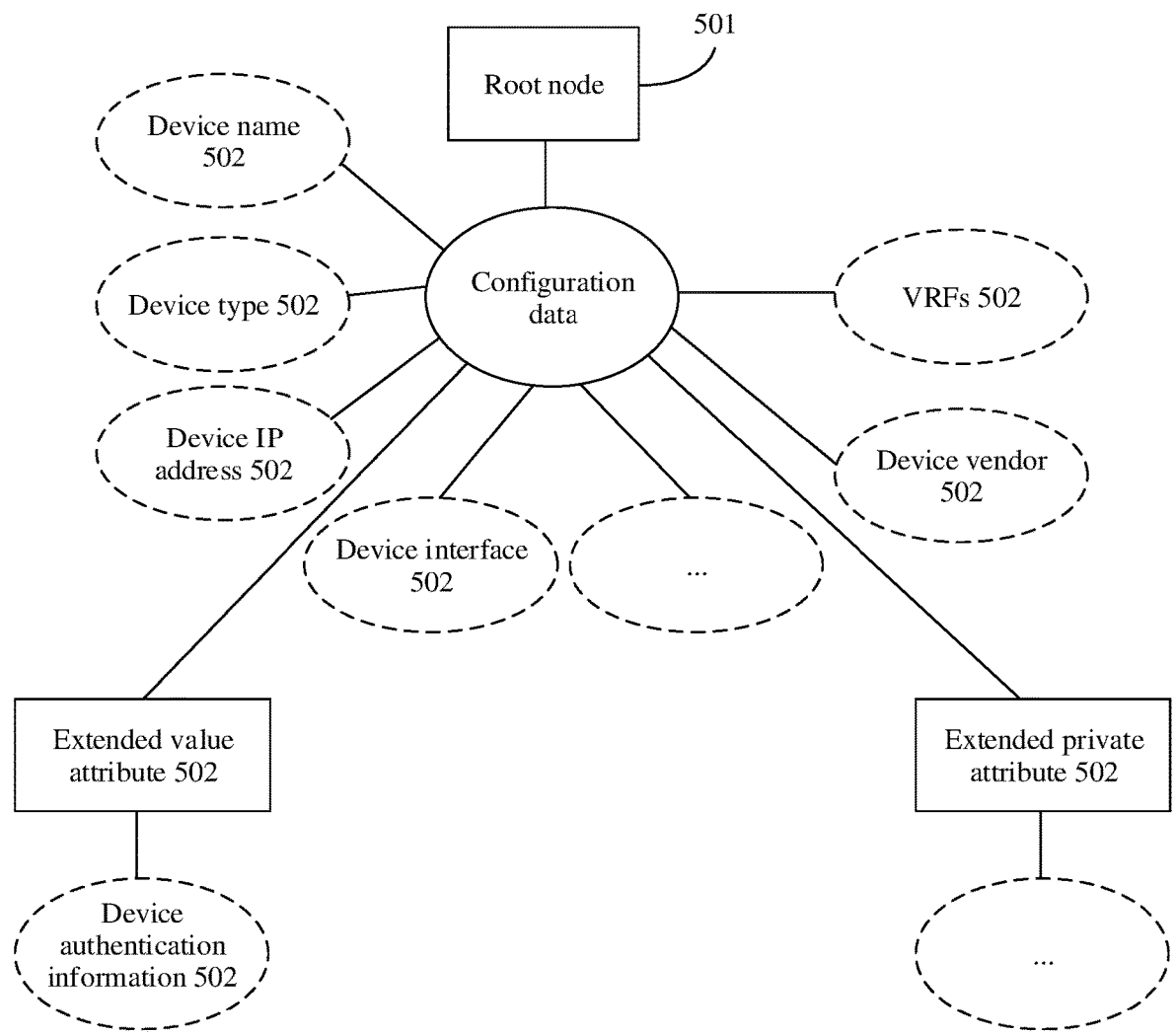
FIG. 5 is a schematic diagram of a logical structure of a data model of configuration data according to an embodiment.

The following describes a schematic diagram of a logical structure of a data model of configuration data according to an embodiment with reference to FIG. 5. The data model has a tree hierarchical structure. Therefore, a data model of configuration data is also called a "configuration tree". The configuration tree may include a root node 501 and a plurality of leaf nodes 502.

The root node 501 may be configured to identify the entire configuration tree. The leaf node 502 may be configured to carry all atom configuration data in a data template. A configuration name, a device type, a device interface, a device IP address, a VRF, a security domain, a device vendor, and the like are carried.

In this embodiment, the tree structure may be used to represent the data model of the configuration data, that is, a data model having a structure similar to that of a YANG model is used, so that a matching degree between the data model of the configuration data and a NETCONF protocol is similar to a matching degree between the YANG model and the NETCONF protocol. This helps promote the foregoing data model of the configuration data according to the NETCONF protocol.

In another aspect, because a structure of the data model of the configuration data in this embodiment is similar to the structure of the YANG model, performance of the YANG model may be used to convert a NETCONF packet, so that the data model of the configuration data in this embodiment and the NETCONF packet are combined, and are applied to a current network. The foregoing process of converting the data model of the configuration data into the NETCONF packet may be referred to as "YANG transformation of a data model of configuration data".

320. The network verification system verifies data links between the plurality of network devices based on the configuration data of the plurality of network devices and a topology structure between the plurality of network devices.

In this embodiment, the network verification system may perform the data link verification on the network based on the topology structure of the network and configuration data described by using the general data modeling language independent of the network devices. This helps improve scalability of the network verification system and avoids relatively poor scalability of network simulation software that occurs when conventional network simulation software provides a template for configuration data of each type of network device.

The foregoing step 320 may include: The network verification system calculates, based on the configuration data of the plurality of network devices and the topology structure between the plurality of network devices, a route to obtain routing forwarding entries of the plurality of network devices; and the network verification system verifies the data links between the plurality of network devices based on the routing forwarding entries of the plurality of network devices.

The routing forwarding entries are directly generated based on the configuration data of the plurality of network devices, and the data link of the network is verified based on the routing forwarding entries. This helps simplify a process of obtaining the routing forwarding entry, and avoids a case in which the network device needs to perform route learning based on the configuration data (for example, an IP address) to obtain the routing forwarding entry in a data link transmission process.

The routing forwarding entries of the foregoing plurality of network devices may be represented by using a plurality of first-order logical expressions.

A routing forwarding entry that transmits data on the network may be represented by using the plurality of first-order logical expressions. A process of verifying the data link of the network may be understood as a process in which the routing forwarding entry described by using the plurality of first-order logical expressions is used as a constraint for transmitting a packet, and then, a transmission status of the packet on the network simulated by a state machine, to verify the data link on the network.

As described above, the foregoing configuration data of the network device may be the configuration data that has been configured for the network device or the configuration data that is to be configured for the network device. A verification process based on the configured configuration data may be referred to as "post-event verification", and a verification process based on the to-be-configured configuration data or the to-be-updated configuration data may be referred to as "pre-event verification".

The following separately describes a method in the embodiments based on a "pre-event verification" scenario and a "post-event verification" scenario.

Figure 6:
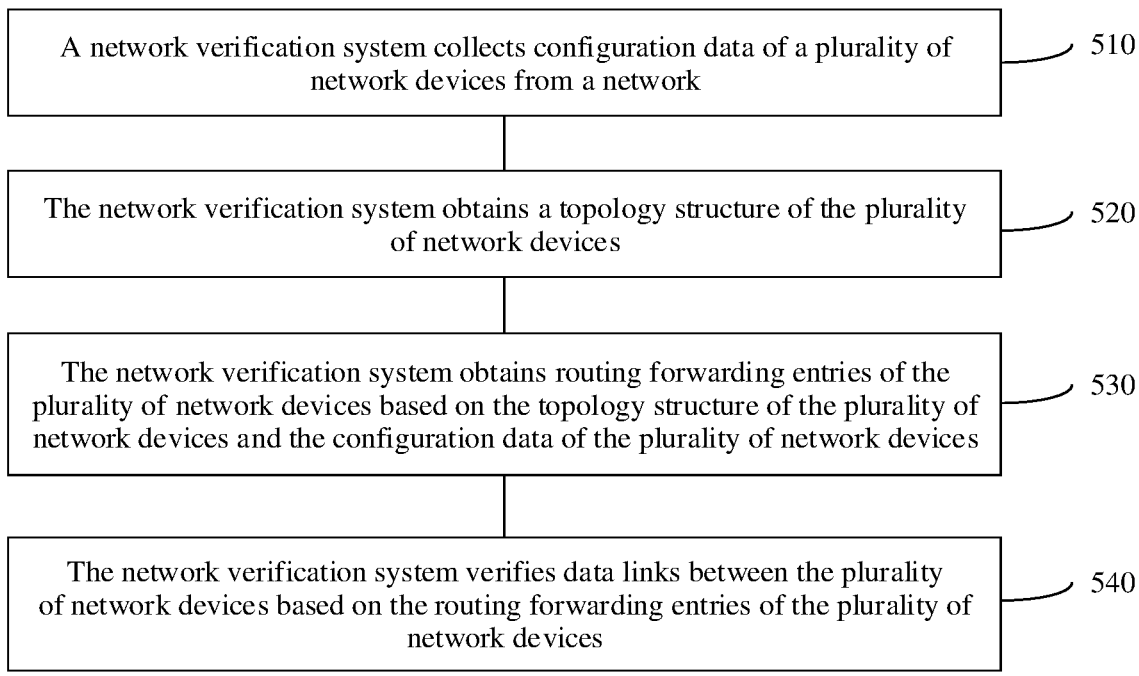
FIG. 6 is a schematic flowchart of a network verification method according to an embodiment.

In a "post-event verification" scenario, a network verification system may be configured to verify configured configuration data of a network device on a network. The following describes a method in the embodiments with reference to FIG. 6. FIG. 6 is a schematic flowchart of a network verification method according to an embodiment, and the method shown in FIG. 6 includes step 510 to step 540.

510. A network verification system may collect configuration data of a plurality of network devices from a network (or referred to as a "real network").

The network verification system may send a NETCONF-get (NETCONF-get) request to the network device, to obtain the configuration data from the network device. Based on a current NETCONF regulation, a format of the foregoing configuration data is a YANG model. The network verification system may further obtain the configuration data of the network device by using another command. For example, when the foregoing network supports a virtual system (Vsys) function, the configuration data may be obtained by using a configuration data obtaining command (get-config) in the Vsys.

520. The network verification system may obtain a topology structure between the plurality of network devices.

It may be understood that the foregoing topology structure may be manually entered by a user into the network verification system, or may be collected by the network verification system from the network according to the NETCONF.

530. The network verification system may obtain routing forwarding entries of the plurality of network devices based on the topology structure between the plurality of network devices and the configuration data of the plurality of network devices.

540. The network verification system may verify data links between the plurality of network devices based on the routing forwarding entries of the plurality of network devices.

Figure 7:
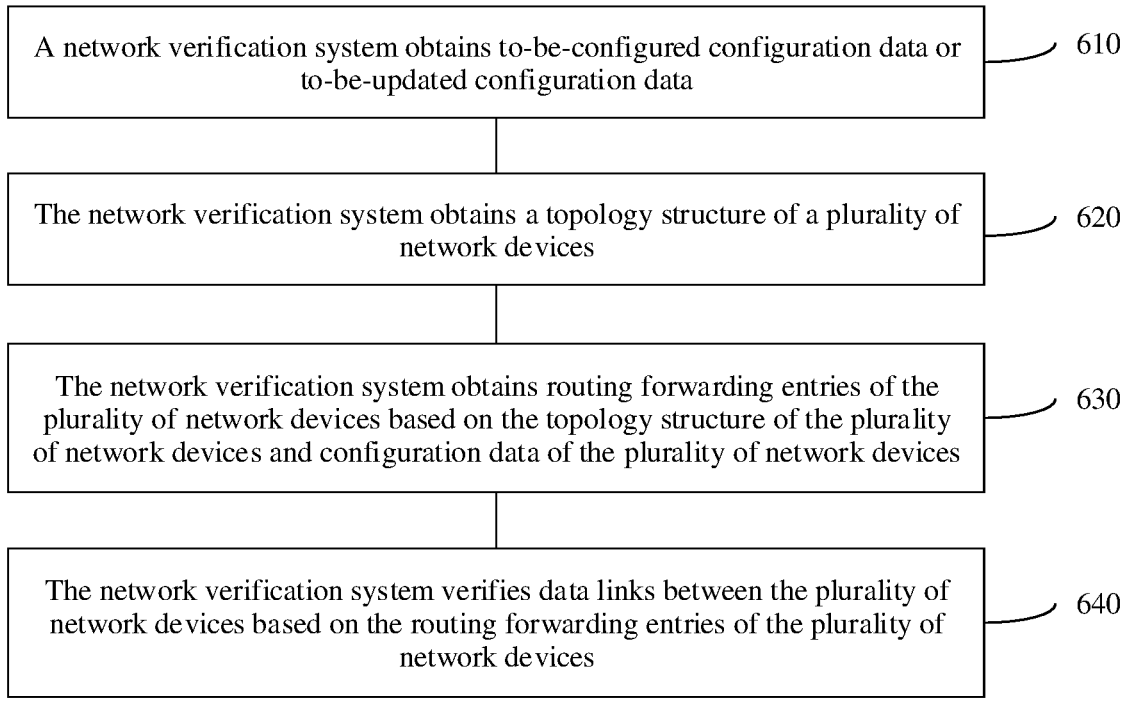
FIG. 7 is a schematic flowchart of a network verification method according to an embodiment.

In a "pre-event verification" scenario, a network verification system is configured to verify configured configuration data of a network device on a network. The following describes a method in the embodiments with reference to FIG. 7. FIG. 7 is a schematic flowchart of a network verification method according to an embodiment, and the method shown in FIG. 7 includes step 610 to step 640.

610. A network verification system obtains to-be-configured configuration data or to-be-updated configuration data.

The foregoing to-be-configured configuration data may be configuration data that is to be configured for one network device or configuration data that is to be configured for a plurality of network devices. The foregoing to-be-updated configuration data may be configuration data that is to be updated for one network device or configuration data that is to be updated for a plurality of network devices.

The foregoing to-be-configured configuration data or the to-be-updated configuration data may be configured by a controller (for example, an SDN controller) on the network for the network device. Before the controller configures or updates the foregoing configuration data for the network device, the network verification system may first perform data link verification based on the to-be-configured configuration data or the to-be-updated configuration data, to determine whether it is proper to use the foregoing to-be-configured configuration data or the to-be-updated configuration data on a real network.

The controller configures configuration data for the network device according to a NETCONF protocol. In The to-be-updated configuration data or the to-be-configured configuration data obtained by the network verification system from the controller is of the YANG model.

620. The network verification system obtains a topology structure between the plurality of network devices.

It may be understood that the foregoing topology structure may be manually entered by a user into the network verification system, or may be collected by the network verification system from the network according to the NETCONF.

630. The network verification system obtains routing forwarding entries of the plurality of network devices based on the topology structure between the plurality of network devices and the configuration data of the plurality of network devices.

640. The network verification system verifies data links between the plurality of network devices based on the routing forwarding entries of the plurality of network devices.

Based on the foregoing description, the network verification system of this embodiment may further perform configuration verification on the network by using the foregoing to-be-configured configuration data or the configured configuration data on the network. In other words, the configuration data of the plurality of network devices may include configuration data of a first network device. The method shown in FIG. 3 further includes: The network verification system performs configuration verification on the first network device based on the configuration data of the first network device, where the configuration verification is to verify one or more data attributes of a data model of the configuration data of the first network device.

The first network device may be any one of the plurality of network devices. In this embodiment, configuration of the plurality of network devices may be further verified by using the foregoing method. Because a verification manner is similar to the foregoing manner of verifying the configuration of the first network device, for brevity, details are not described herein again.

Based on whether the configuration data is configured configuration data or to-be-configured configuration data, a "post-event" verification scenario and a "pre-event" verification scenario may be classified. In the pre-event verification scenario or the post-event verification scenario, for a manner of obtaining the configuration data, refer to descriptions in FIG. 6 and FIG. 7. For brevity, details are not described herein again.

The foregoing mainly describes a data link verification process in the embodiments with reference to FIG. 6 and FIG. 7. It may be understood that configuration data carried in a data model of configuration data in the embodiments may be further used for configuration verification of the network. For a configuration verification type, refer to related descriptions in FIG. 1. For brevity, details are not described herein.

It may be understood that the foregoing configuration verification and the data link verification may be used together, or may be used independently.

A process of the foregoing configuration verification may be combined with the "pre-event verification" and the "post-event verification" shown in FIG. 6 and FIG. 7. In addition, the process of the configuration verification may be used after the data link verification, may be used before the data link verification, or may be separately used to be independent of the data link verification.

The foregoing describes the method in the embodiments with reference to FIG. 1 to FIG. 7. The following describes an apparatus in the embodiments with reference to FIG. 8 and FIG. 9. It may be understood that some or all of the steps in FIG. 3, FIG. 6, and FIG. 7 may be performed in FIG. 8 and FIG. 9. For brevity, details are not described herein again.

Figure 8:
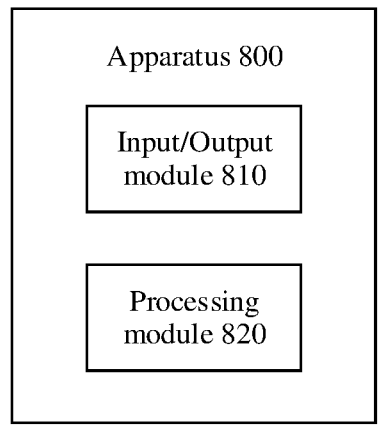
FIG. 8 is a schematic diagram of a network verification apparatus according to an embodiment.

FIG. 8 is a schematic diagram of a network verification apparatus according to an embodiment, and the apparatus 800 shown in FIG. 8 includes an input/output module 810 and a processing module 820.

The input/output module 810 is configured to obtain configuration data of a plurality of network devices, where a data model of the configuration data is described by using a general data modeling language independent of the network devices.

The processing module 820 is configured to verify data links between the plurality of network devices based on the configuration data of the plurality of network devices and a topology structure between the plurality of network devices.

In an embodiment, the processing module 820 may be configured to: calculate, based on the configuration data of the plurality of network devices and the topology structure between the plurality of network devices, a route to obtain routing forwarding entries of the plurality of network devices, and verify the data links between the plurality of network devices based on the routing forwarding entries.

In an embodiment, the data model of the configuration data may include a common data attribute of the configuration data and an extensible data attribute of the configuration data. The common data attribute may include one or more of the following data attributes: a configuration name, a device type, a device interface, a device Internet Protocol IP address or a virtual private network routing and forwarding table VRF. The extensible data attribute includes a private data attribute.

In an embodiment, the data model of the configuration data is in a tree structure, the extensible data attribute in the data model is a path that stores the extensible data attribute, and the path is used to point to a node that stores the extensible data attribute and that is in the tree structure.

In an embodiment, the configuration data of the plurality of network devices may include configuration data of a first network device. The processing module 820 is further configured to perform configuration verification on the first network device based on the configuration data of the first network device, where the configuration verification is to verify one or more data attributes of a data model of the configuration data of the first network device.

In an embodiment, the configuration data may be any one of the following: to-be-configured configuration data; configured configuration data; and to-be-updated configuration data.

In an embodiment, the plurality of network devices may include a second network device. The general data modeling language is a YANG model. The input/output module may be further configured to: receive a Network Configuration Protocol NETCONF packet, where the NETCONF packet includes configuration data of the second network device, and the configuration data of the second network device is used to configure the second network device, or update configuration of the second network device.

In an optional embodiment, the processing module 820 may be a processor 920, the input/output module 810 may be an input/output interface 930, and the network verification system may further include a memory 910. Details are shown in FIG. 9.

Figure 9:
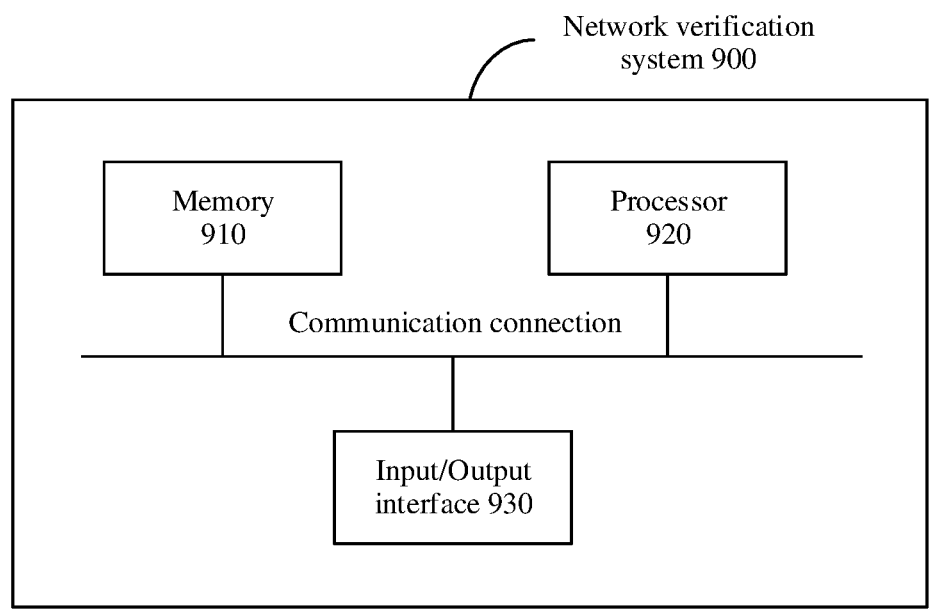
FIG. 9 is a schematic diagram of another network verification system according to an embodiment.

FIG. 9 is a schematic diagram of another network verification system according to an embodiment. The network verification system 900 shown in FIG. 9 may include a memory 910, a processor 920, and a communications interface 930. The memory 910, the processor 920, and an input/output interface 930 are connected by using an internal connection path, for example, a bus. The memory 910 is configured to store an instruction. The processor 920 is configured to: execute the instruction stored in the memory 920, receive input data and information through the communications interface 930, and output an operation result and the like.

The foregoing network verification system 900 may include one or more servers.

In an implementation process, steps in the foregoing method can be implemented by using a hardware integrated logical circuit or an instruction in a form of software in the processor 920. The method of the communication disclosed with reference to the embodiments may be directly performed by a hardware processor, or may be performed by using a combination of hardware and a software module in the processor. The software module may be located in a mature storage medium in the art, such as a random access memory, a flash memory, a read-only memory, a programmable read-only memory or an electrically erasable programmable memory, and a register. The storage medium is located in the memory 910. The processor 920 reads information in the memory 910 and implements the steps in the foregoing method in combination with hardware of the processor. To avoid repetition, details are not described herein again.

The processor 920 may be a central processing unit (CPU), or may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like.

It may be understood that in this embodiment, the memory may include a read-only memory and a random access memory, and provide an instruction and data to the processor. A part of the processor may further include a non-volatile random access memory. For example, the processor may further store information of a device type.

It may be understood that in the embodiments, "B corresponding to A" indicates that B is associated with A, and B may be determined according to A. However, it may also be understood that A determines B does not mean that B is determined according to A only, that is, B may also be determined according to A and/or other information.

It may be understood that the term "and/or" is merely an association relationship for describing associated objects and indicates that three relationships may exist. For example, A and/or B may represent the following three cases: Only A exists, both A and B exist, and only B exists. In addition, the character "/" generally indicates an "or" relationship between the associated objects.

It may be understood that sequence numbers of the foregoing processes do not mean execution sequences in various embodiments. The execution sequences of the processes may be determined according to functions and internal logic of the processes, and is non-limiting.

In the several embodiments provided, it may be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a website, a computer, a server, or a data center to another website, another computer, another server, or another data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely exemplary implementations and are non-limiting. Any variation or replacement readily figured out by a person of ordinary skill in the art within the scope disclosed and are non-limiting.

What is claimed is:

1. A network verification method, comprising:
   obtaining, by a network verification system, configuration data of a plurality of network devices, wherein the configuration data of the plurality of network devices is at least one of configuration data that has been configured for the network devices, configuration data that is to be configured for the network devices, and configuration data that is to be updated for the network devices, wherein a data model of the configuration data is described by using a general data modeling language independent of the network devices; and
   verifying, by the network verification system, data links between the plurality of network devices based on the configuration data of the plurality of network devices and a topology structure between the plurality of network devices by:
   calculating, by the network verification system based on the configuration data of the plurality of network devices and the topology structure between the plurality of network devices, a route to obtain routing forwarding entries of the plurality of network devices; and
   verifying, by the network verification system, the data links between the plurality of network devices based on the routing forwarding entries of the plurality of network devices.

2. The method according to claim 1, wherein the data model comprises a common data attribute and an extensible data attribute, the common data attribute comprises one or more of the following data attributes: a configuration name, a device type, a device interface, a device Internet Protocol (IP) address or a virtual private network routing and forwarding table, and the extensible data attribute comprises a private data attribute.

3. The method according to claim 1, wherein the configuration data of the plurality of network devices comprises configuration data of a first network device, and the method further comprises:
   performing, by the network verification system, configuration verification on the first network device based on the configuration data of the first network device, wherein the configuration verification is to verify one or more data attributes of a data model of the configuration data of the first network device.

4. The method according to claim 1, wherein the configuration data of the plurality of network devices comprises: to-be-configured configuration data, configured configuration data, and to-be-updated configuration data.

5. The method according to claim 1, wherein the plurality of network devices comprises a second network device, the general data modeling language is a YANG model, and the obtaining, by a network verification system, of the configuration data of a plurality of network devices on a network comprises:
   receiving, by the network verification system, a Network Configuration Protocol (NETCONF) packet, wherein the NETCONF packet comprises configuration data of the second network device, and the configuration data of the second network device is used to configure the second network device, or update configuration of the second network device.

6. A network verification apparatus, comprising:
   an input/output interface configured to obtain configuration data of a plurality of network devices on a network, wherein the configuration data of the plurality of network devices is at least one of configuration data that has been configured for the network devices, configuration data that is to be configured for the network devices, and configuration data that is to be updated for the network devices, wherein a data model of the configuration data is described by using a general data modeling language independent of the network devices;
   a memory configured to store instructions; and
   a processor, configured to execute the instructions to:
   verify data links between the plurality of network devices based on the configuration data of the plurality of network devices and a topology structure between the plurality of network devices, wherein the processor is configured to execute the instructions to:
   calculate, based on the configuration data of the plurality of network devices and the topology structure between the plurality of network devices, a route to obtain routing forwarding entries of the plurality of network devices; and verify the data links between the plurality of network devices based on the routing forwarding entries of the plurality of network devices.

7. The apparatus according to claim 6, wherein the data model of the configuration data comprises a common data attribute of the configuration data and an extensible data attribute of the configuration data, the common data attribute comprises one or more of the following data attributes: a configuration name, a device type, a device interface, a device Internet Protocol (IP) address or a virtual private network routing and forwarding table, and the extensible data attribute comprises a private data attribute.

8. The apparatus according to claim 6, wherein the configuration data of the plurality of network devices comprises configuration data of a first network device, and the processor configured to execute the instructions to perform configuration verification on the first network device based on the configuration data of the first network device, wherein the configuration verification is to verify one or more data attributes of a data model of the configuration data of the first network device.

9. The apparatus according to claim 6, wherein the configuration data of the plurality of network devices comprises: to-be-configured configuration data, configured configuration data, and to-be-updated configuration data.

10. The apparatus according to claim 6, wherein the plurality of network devices comprises a second network device, the general data modeling language is a YANG model, and the processor is configured to execute the instructions to:

receive a Network Configuration Protocol (NETCONF) packet, wherein the NETCONF packet comprises configuration data of the second network device, and the configuration data of the second network device is used to configure the second network device, or update configuration of the second network device.

11. A network system comprising a network verification system and plurality of network devices, the network verification system is configured to:

obtain configuration data of a plurality of network devices, wherein the configuration data of the plurality of network devices is at least one of configuration data that has been configured for the network devices, configuration data that is to be configured for the network devices, and configuration data that is to be updated for the network devices, wherein a data model of the configuration data is described by using a general data modeling language independent of the network devices; and verify data links between the plurality of network devices based on the configuration data of the plurality of network devices and a topology structure between the plurality of network devices by:

calculating, based on the configuration data of the plurality of network devices and the topology structure between the plurality of network devices, a route to obtain routing forwarding entries of the plurality of network devices; and verifying the data links between the plurality of network devices based on the routing forwarding entries of the plurality of network devices.

12. The network system according to claim 11, wherein the data model comprises a common data attribute and an extensible data attribute, the common data attribute comprises one or more of the following data attributes: a configuration name, a device type, a device interface, a device Internet Protocol (IP) address or a virtual private network routing and forwarding table, and the extensible data attribute comprises a private data attribute.

13. The network system according to claim 12, wherein the configuration data of the plurality of network devices comprises configuration data of a first network device, and the network verification system is further configured to:

perform configuration verification on the first network device based on the configuration data of the first network device, wherein the configuration verification is to verify one or more data attributes of a data model of the configuration data of the first network device.

14. The network system according to claim 13, wherein the configuration data of the plurality of network devices comprises: to-be-configured configuration data, configured configuration data, and to-be-updated configuration data.

15. The network system according to claim 14, wherein the plurality of network devices comprises a second network device, the general data modeling language is a YANG model, and the network verification system is further configured to:

receive a Network Configuration Protocol (NETCONF) packet, wherein the NETCONF packet comprises configuration data of the second network device, and the configuration data of the second network device is used to configure the second network device, or update configuration of the second network device.

* * * * *